S. G. Mason.
Pump Piston.
No. 89,060. Patented Apr. 20, 1869.
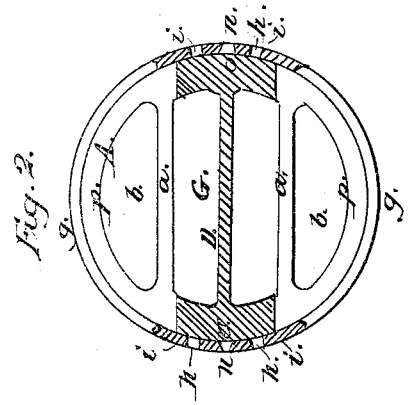
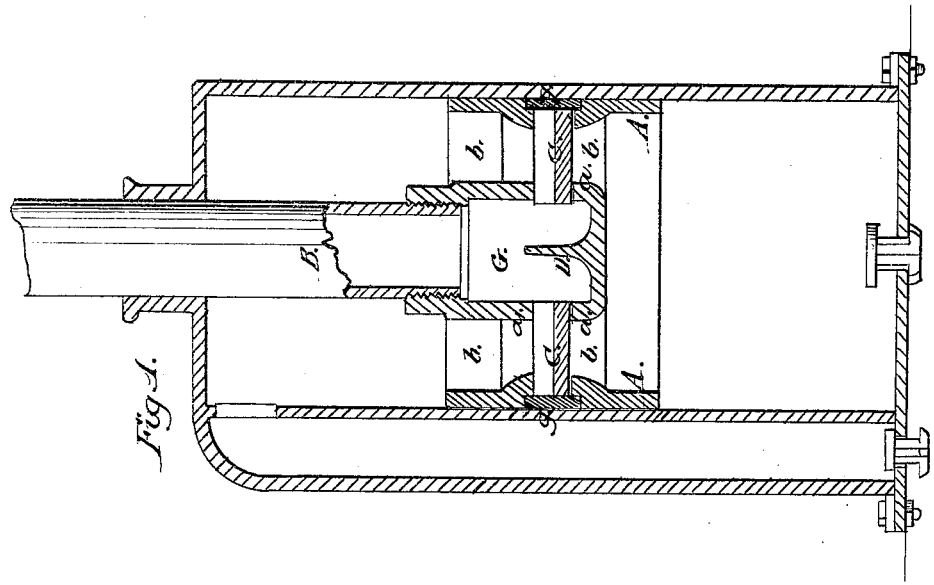
Witnesses:
J. R. Drake
Geo. W. Miatt
Inventor:
Sylvester G. Mason
J. Fraser & Co.
Atty.

SYLVESTER G. MASON, OF ROCHESTER, NEW YORK.

Letters Patent No. 89,060, dated April 20, 1869; antedated April 15, 1869.

IMPROVEMENT IN PUMP-PISTON.

The Schedule referred to in these Letters Patent and making part of the same.

*To all whom it may concern:*

Be it known that I, SYLVESTER G. MASON, of the city of Rochester, in the county of Monroe, and State of New York, have invented a certain new and useful Improvement in Double-Acting Pump-Pistons; and I do hereby declare that the following is a full and exact description thereof, reference being had to the accompanying drawings, making part of this specificaion.

Figure 1 is a vertical section of my improved piston, situated in a pump-cylinder.

Figure 2, a horizontal section of the piston.

Like letters of reference indicate corresponding parts in both figures.

This invention is an improvement on my application, for which a patent was allowed, March 9, 1868, and is now issuing.

The distinctive features in that case are openings made in the sides of the piston, in which are inserted valves covered and held in place by metallic rings.

My invention consists in an improved arrangement of the rings, whereby the piston is especially adapted to deep wells.

In the drawings—

A indicates the shell of the piston, and

B, the hollow piston-rod, screwing therein.

C C are the valves, inserted in openings, *p p*, from opposite sides, and which strike alternately against valve-seats, *a a*, as the water enters ports or passages, *b b*.

Segmental rings, *g g*, cover the opening containing the valves.

Thus far the device is similar to my prior case, above referred to.

The chamber G is made enlarged, and is situated near the top of the piston.

A partition, D, is formed in it, projecting up from the bottom, above the top of openings *p*, and extending longitudinally through from end to end.

The chamber G is made of sufficient capacity to allow the water to collect in considerable body before being elevated through tube B, so as to make the flow more even and uniform.

By the employment of the central partition, D, combined with the enlarged chamber G, the two currents of water, entering at opposite sides, strike the partition in the centre, and are deflected upward, and come together in a body above the openings *p* in the upper portion of the chamber, and thence pass up through tube B in an even and uniform body, and without displacing the opposing valves.

Where the partition D is not employed, the opposing currents, in striking together, not only displace the valves, but produce a foaming, or boiling action of the water, and neutralize the force of the two currents, and therefore prevent easy rising. The partition gives a direction to the current before it reaches the pipe.

The segmental rings *g g* serve to enclose the openings *p p*, and secure the valves in place.

The rings are provided with holes, *i i*, near the end of each segment, and are held in place by springing over pins, or bearings, *h h*.

The ends of the segments are made inclined inward, as shown at *n n*, and spaces, *o o*, are left between them, to allow an instrument to be inserted to pry the rings off the pins, or bearings, when it is desired to remove them.

In my former case, I employ segmental packing-rings, which are free, and press out against the sides of the cylinder, to produce a packing.

In the employment of this device in deep wells, I find that the inside pressure of the water against the packing-rings is so great as to produce a considerable degree of friction against the cylinder, and prevent the easy operation of the piston.

In my present device, I obviate all difficulty of this kind, as the rings *g g* are secured firmly to the piston by springing them over the pins, or bearings *h h*.

What I claim as my invention, and desire to secure by Letters Patent, is—

The arrangement of the segmental rings *g g*, with holes *i i*, the pins, or bearings *h h*, and spaces *o o*, in combination with a piston having openings, *d d*, and valves C C, substantially as and for the purpose herein set forth.

In witness whereof, I have hereunto signed my name, in the presence of two subscribing witnesses.

SYLVESTER G. MASON.

Witnesses:
W. J. CREELMAN,
R. F. OSGOOD.